3,053,082
PRESSURE COMPENSATOR FOR GASEOUS FLUID METERS

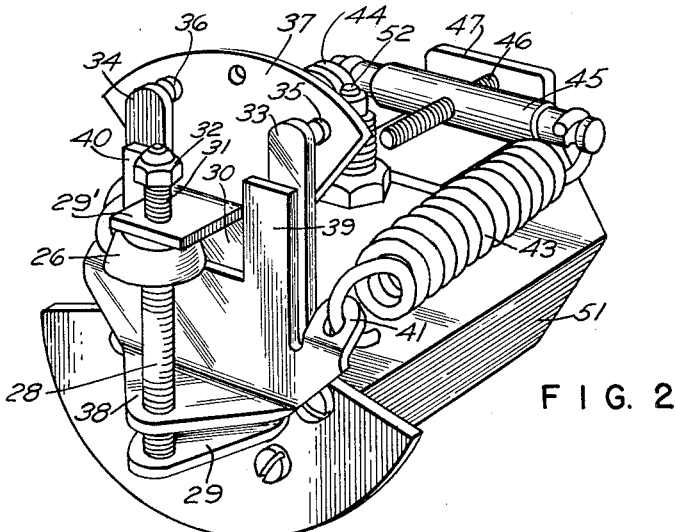
FIG. 2
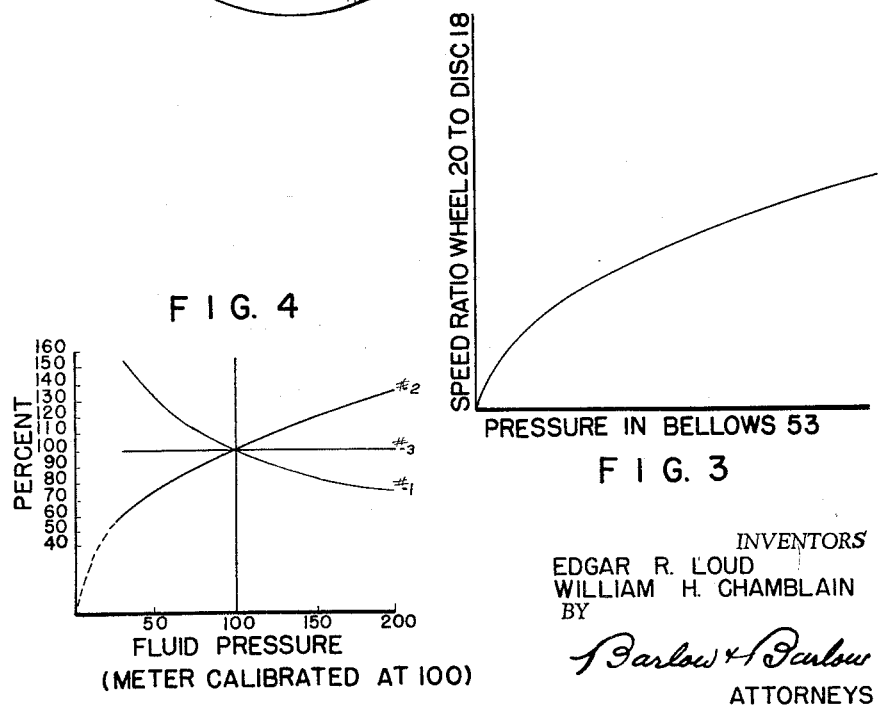
FIG. 4
FIG. 3
INVENTORS
EDGAR R. LOUD
WILLIAM H. CHAMBLAIN
BY
Barlow & Barlow
ATTORNEYS

Edgar R. Loud, Cranston, and William H. Chamberlain, Barrington, R.I., assignors, by mesne assignments, to The New York Air Brake Company, New York, N.Y., a corporation of New Jersey
Filed June 9, 1959, Ser. No. 819,148
1 Claim. (Cl. 73—198)

This invention relates to a pressure compensator for gaseous fluid flow-meters, which device automatically and continuously modifies the rotative output of the primary element in accordance with variations in the pressure of the fluid.

United States Patent No. 2,243,252 shows the type of meter to which the present invention is applicable. The rotative output of such a meter is, through a suitable gearing arrangement, directed to an integrator or totalizer for displaying the accumulated flow of fluid. Mathematically the amount of fluid, or the rate of flow, through a meter of this type varies substantially as the square root of the specific density of the fluid at the point of metering. The gearing can be selected so that the totalizer reads in integral units, such as pounds or cubic feet, for one predetermined pressure, and no other, however, the readings on such a meter are accurate only if the operating pressure is the same as that for which the meter was originally calibrated.

It is accordingly an object of the invention to provide a pressure compensating device which will operate between a metering device and a totalizing device.

Another object of the invention is to provide a compensating device for a fluid flow meter or the like which will correct the measurement information in accordance with the square root of the specific density of the fluid due to changes in pressure.

A still further object of the invention is to provide a pressure compensating device which will have a high degree of accuracy and reliability of operation.

Another object of the invention is to provide a pressure compensating device for a fluid flow meter which will operate over a rather wide pressure range and which can be adjusted readily.

With these and other objects in view the invention consists of certain novel features of construction as will be more fully described and particularly pointed out in the appended claim.

In the drawings:

FIGURE 2 is a perspective view of the compensating device; and

FIGURES 3 and 4 are graphs illustrating the operation of the device.

Figure 1:
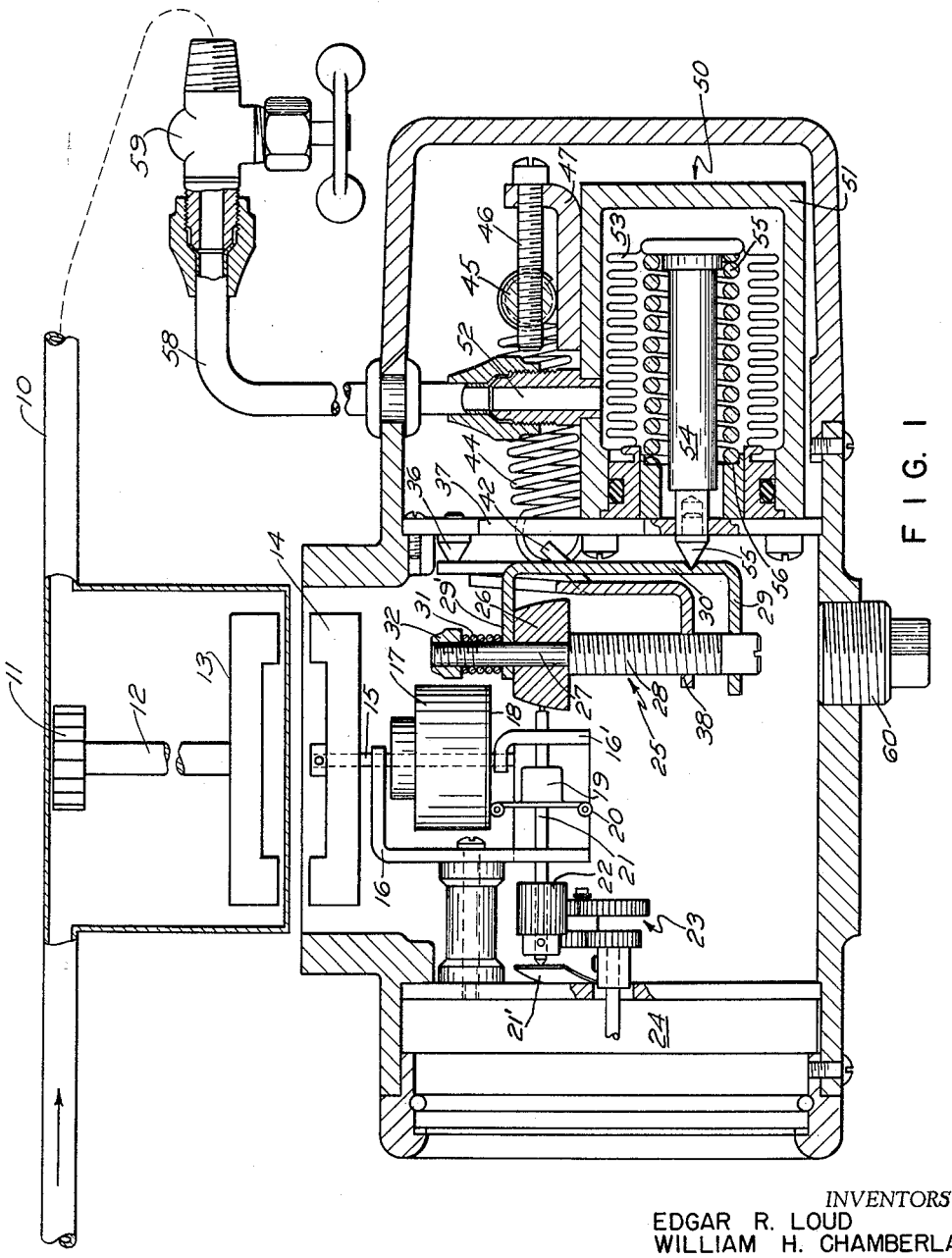
FIGURE 1 is a sectional view through the compensating device of the invention showing diagrammatically the connections to associated apparatus.

In proceeding with the invention, an infinitely variable speed drive consisting of an integrating disc driven by the primary metering element and an integrating wheel movable radially on said disc by a pressure sensing element is provided. With such an arrangement the result obtained is a linear relation between wheel speed and wheel position. In order to satisfy the square root relation between pressure and flow, it is necessary to modify this linear relation by interposing a cam device between the pressure sensing element and the integrating wheel as hereinafter described.

Referring now to the drawings, 10 indicates generally a fluid flow into which a suitable primary element or rotor 11 is placed. The primary element may include suitable damping means and reduction gearing as shown in the afore-mentioned patent, all designed so that the rotative speed of element 10 is directly proportional to the volume rate of flow of fluid in line 10. The output of the primary element 11 is conveniently transmitted via a shaft 12 and a driving magnet 13 to a complementary driven magnet 14 which carries a shaft 15 journalled in brackets 16, 16'. Shaft 15 carries what may be generically termed as an integrating disc 17 that has an operating face 18 that may be coated with a material that will resist slippage of a mating part therewith.

From the above it will be apparent that rotation of the rotor 11 is transmitted to the integrating disc 17 through a magnetic coupling which is used in the present instance instead of a stuffing box to avoid leakage of fluid into the integrating mechanism. The rotative output of the integrating disc 17 is transmitted to an integrating wheel 19 having a plurality of rollers 20 around its periphery, the wheel 19 being secured to a shaft 21 which is journalled in brackets 16, 16'. The shaft 21 may have suitably mounted thereon a gear 22 which, through a suitable gear train 23, may transmit motion to a totalizer of any well-known form which may be located in the space 24, which mechanism has been deleted for clarity. One end of the shaft 21 engages a portion of a correcting mechanism generally indicated 25 and is urged into engagement therewith by a suitable spring 21'.

The correcting mechanism 25 is a result of a need to modify the linear relation which would be obtained from the integrating wheel and disc arrangement if the pressure acted directly on the shaft 21. Basically the mechanism 25 consists of a cam 26 which is mounted on a reduced end 27 of a screw 28. The screw 28 is in turn received in two upstanding lugs 29, 29' of a pivoting lever 30. The cam is held in position relative to the screw 28 by reason of the fact that it abuts the shoulder between the main section of the screw 28 and the reduced section 27 and also abuts the lug 29', the screw 28 being held in position against the lug 29' by reason of a compression spring 31 and stop nut 32 which encircle and are threaded upon the reduced section 27. One end of lever 30 is bifurcated into two legs 33, 34 (see FIG. 2) which are received respectively on pivots 35, 36 that protrude from mounting plate 37. This arrangement assures that the cam surface 26 is more nearly perpendicular to the axis of shaft 21. Associated with this mechanism is a variable force spring biasing arrangement that in addition to varying the force applied to the lever 30 will also change the position of application. The purpose of this particular arrangement is to provide means for adjusting the rate of correction and the zero setting.

Basically, this arrangement consists of an L-shaped bracket 38 which is threadedly received on the screw 28 and which has a bifurcated end consisting of two legs 39, 40 (FIG. 2) which bear upon the legs 33, 34 of the lever 30. Lugs 41, 42 extend from either side of the bracket 38. Holes provided therein receive tension springs 43, 44 respectively. The other ends of springs 43, 44 are attached to a crossbar 45 which has a central threaded diametric bore therethrough that receives a threaded screw 46 which passes through an aperture in a fixed support number 47, the head of the screw 46 abutting the support 47. Accordingly by rotation of the screw 46, the position of the crossbar 45 may be varied which in turn lengthens or shortens the springs 43, 44. This movement varies the force applied to the compensating assembly 25, which force will be effectively applied to the lever 30. The location of the application of this force to the lever 30 may be varied by adjusting the screw 28 which will move the bracket 38 relative to the lever 30.

Actuating this entire compensating assembly is a pressure responsive bellows mechanism designated generally 50. The pressure mechanism consists of an outer casing 51 which has an inlet port 52 communicating therewith.

Within the casing there is positioned a flexible bellows 53, the free end of which abuts an actuating rod 54 having a pointed end 55 for engagement with the lever 30. Surrounding the actuating rod 54 is a compression spring 55 one end of which abuts the inner end of casing 51 as at 56 while the other end abuts the rod 54 at the free end of bellows 53. The inlet port 52 of the casing 51 is connected through suitable piping such as 58 and valve 59 to the fluid line 10 so that at all times the pressure of the fluid in the line 10 will be transmitted to the casing 51 and to the exterior of bellows 53, so as to position the free end of the bellows, as opposed by spring 55, in accordance with the pressure in line 10. An outer casing is provided for the entire mechanism with removable plug 60 to allow access to the screw 28 for adjusting same.

It will be apparent from the above-detailed description that as the pressure rises in the fluid line the integrating wheel 19 is moved horizontally to a greater radius of the integrating disc 17 thereby increasing its speed of rotation (see FIG. 3). This correction is applied in the proper direction since it is known, from basic theory that the drive ratio should be substantially equal to the absolute pressure raised to the 0.474 power for saturated steam and to the 0.5 power for perfect gases at constant temperature. The cam shape may be readily developed by a simple process of trigonometric projection by first lying out linear incremental movements of the bellows and the resulting position of the lever 30 and then translating this movement and correlating it with the desired non-linear logarithmic increments of the wheel position which will result in the desired cam shape.

Briefly, the effects of the device are exemplified by the graphs of FIGURE 4. Here curve #1 represents the effect of changes in pressure for an uncompensated meter. This is the undesirable result that is to be eliminated. Curve #2 is a transposition of the curve of FIGURE 3 and shows the opposite characteristic that is produced by this device, the resultant being substantially a straight line represented by curve #3. Accordingly, there is here provided a device that effectively modifies the rotative output of a shaft in accordance with variations in fluid pressure.

We claim:

A fluid flow meter compensating device comprising a rotative input shaft and a rotative output shaft, an integrating disc and wheel, said disc coupled to said input shaft, said wheel mounted for rotation on said output shaft, means for positioning said wheel radially of said disc, said means including a pressure responsive device coupled to a pivoted lever, said lever having a cam surface thereon positioned to engage said output shaft, means for applying a variable restraining force to said pivoted lever, said means including a shiftable coupling point along the lever arm.

References Cited in the file of this patent
UNITED STATES PATENTS

| | | |
|---|---|---|
| 2,222,551 | Zieboly | Nov. 19, 1940 |
| 2,348,593 | Beitler | May 9, 1944 |
| 2,537,751 | Grise | Jan. 9, 1951 |

FOREIGN PATENTS

| | | |
|---|---|---|
| 623,539 | Great Britain | May 19, 1949 |